(12) United States Patent
Zhang (10) Patent No.: US 11,069,170 B2
(45) Date of Patent: Jul. 20, 2021

(54) METHOD OF VERIFIABLE AND ANONYMOUS VOTER RECEIPT FOR ELECTRONIC VOTING SYSTEM

(71) Applicant: Zhenxiang Zhang, St.Catharines (CA)

(72) Inventor: Zhenxiang Zhang, St.Catharines (CA)

(*) Notice: Subject to any disclaimer, the term of this patent is extended or adjusted under 35 U.S.C. 154(b) by 123 days.

(21) Appl. No.: 15/830,049

(22) Filed: Dec. 4, 2017

(65) Prior Publication Data

US 2018/0218553 A1    Aug. 2, 2018

Related U.S. Application Data

(60) Provisional application No. 62/430,677, filed on Dec. 6, 2016.

(51) Int. Cl.
*G07C 13/00* (2006.01)
*G06F 21/62* (2013.01)
*G06F 40/18* (2020.01)

(52) U.S. Cl.
CPC ......... *G07C 13/00* (2013.01); *G06F 21/6254* (2013.01); *G06F 21/6263* (2013.01); *G06F 40/18* (2020.01); *G06F 2221/2101* (2013.01); *G06Q 2230/00* (2013.01)

(58) Field of Classification Search
CPC ............. H04L 2209/463; H04L 9/3218; H04L 2209/42; H04L 63/12

USPC ..................... 235/386, 51; 705/12
See application file for complete search history.

(56) References Cited

U.S. PATENT DOCUMENTS

| | | | |
|---|---|---|---|
| 2002/0169756 A1* | 11/2002 | Biddulph | G07C 13/00 |
| 2003/0034393 A1* | 2/2003 | Chung | G07C 13/00 |
| | | | 235/386 |
| 2007/0192176 A1* | 8/2007 | Onischuk | B42D 15/00 |
| | | | 705/12 |

* cited by examiner

*Primary Examiner* — Jamara A Franklin (57) ABSTRACT

A method of voting that provides an anonymous, verifiable, audit-able, secure, and anti-rigging voter receipt with secrecy and transparency. This voter receipt prints a voter's selection by filling a voter's Unique Voter Number with Signature Letter (UVNS) consisting of a Unique Voter Number and a voter Signature letter, into one of a group of the selections of a ballot. The voter receipt also prints one or more voter selections of other voters' UVNS in the remaining selections of the group of selections of a ballot; The voter receipt can print on paper, record in a memory device, mobile text or email; The voter receipt can verify with a published result of an election; A third party can audit all voter receipts in the election; The method of this application can utilize on an electronic voting (EV) system connected with a local network at a polling station, mobile network or internet.

19 Claims, 12 Drawing Sheets

| 2030 Election | Dec. 8, 2030 | Lee County | Polling devision | Receipt No. VR-003466 | | |
|---|---|---|---|---|---|---|
| President (select 1) | | | | | | |
| Candidate1 | Candidate2 | Candidate3 | Candidate4 | | Write-In | Abandon |
| A-113200-$ | A-748345-G | A-943765-H | A-386645-J | | A-557293-X | A-487038-V |
| | | | | | | |
| Senator (Select 2) | | | | | | |
| Candidate1 | Candidate2 | Candidate3 | Write-In (1) | Write-In (2) | Abandon | Abandon |
| B-39879-S | B-498003-M | B-388477-D | B-2873601-$ | B-3108936-& | B-8726731-@ | B-3185190-N |
| | | | | | | |
| Amendment | | | | | | |
| Yes | No | | | | | Abandon |
| C-399216-R | C-794966-E | | | | | C-4028331-# |

| 2000 ELECTION | Lee County | Polling division | Voter receipt list |
|---|---|---|---|
| Dec 8, 2000 | | | |
| | SN | Voter receipt # | Email Address |
| | 1 | VR-000001 | m12u108skylineavenewyork@vote.org |
| | 2 | VR-000003 | d12u108skylineavenewyork@vote.org |
| | 3 | VR-000008 | t1320skylinecapecoral@vote.org |
| | 4 | VR-000015 | - |
| | 5 | VR-000016 | c820mainstnewyork@vote.org |
| | - | | - |
| | 44,998 | VR-103582 | - |
| | 44,999 | VR-103962 | |
| | 45,000 | VR-113856 | pu201b20mainstnewyork@vote.org |

| 2000 ELECTION | Dec 8,2000 | Lee County | Polling division | ELECTION RESULT | Category A | | | |
|---|---|---|---|---|---|---|---|---|
| President Election | | | | | | | | |
| 747 | Candidate1 | Candidate2 | Candidate3 | Candidate4 | | Write-In | Abandon | |
| | A000002-B | A000001-$ | A000007-H | A000009-J | | A000090-< | A000017-V | |
| | A000005-& | A000004-M | A000021-# | A000030-F | | A000186-X | A000033-* | |
| | A000011-K | A000018-Q | A000052-A | A000082-T | | A000273-G | A000048-B | |
| | . | . | . | . | . | . | . | |
| | A839879-> | A698003-M | A988477-D | A700873-% | | A001753-F | A003895-! | |
| | . | . | . | . | . | . | . | TOTAL VOTES |
| SUB TOTAL VOTES | 12,000 | 14,000 | 6,200 | 5,500 | | 7,000 | 300 | 45,000 |

| 2000 ELECTION | Dec 8, 2000 | Lee County 33914 | Polling division | ELECTION RESULT | Category B | | | |
|---|---|---|---|---|---|---|---|---|
| Senator Election | 840 | | 845 | 850 | 855 | | | |
| Two selections | Candidate1 | Candidate2 | Candidate3 | Write-In (1) | Write-In (2) | Abandon (1) | Abandon (2) | |
| | B000001-M | B000002-7 | B000007-Q | B000082-L | B000093-< | B000018-X | B000019-^ | |
| | B000003-H | B000005-W | B000022-* | B000096-& | B000337-$ | B000287-S | B000295-D | |
| | B000010-Y | B000012-S | B000058-# | B0001163-O | B000528-I | B000386-L | B000411-F | |
| | · | · | · | · | · | · | · | |
| | B16394-& | B698082-R | B120582-A | B016534-Z | B034281-C | B007253-S | B007254-B | |
| | · | · | · | · | · | · | · | TOTAL VOTES |
| SUB TOTAL VOTES | 30,500 | 25,500 | 28,000 | 3,000 | 2,000 | 600 | 400 | 90,000 |

| 2000 ELECTION | Dec 8,2000 | Lee County | Polling division | ELECTION RESULT | Category C | | |
|---|---|---|---|---|---|---|---|
| Amendment | | | | | | | |
| | YES | | NO | | | Abandon | |
| | C000002-E | | C000006-T | | | C000094-$ | |
| | C000006-2 | | C000023-K | | | C000202-U | |
| | C000014-R | | C000055-P | | | C000284-Q | |
| | - | | - | | | - | |
| | C839873-T | | C988498-W | | | C001788-J | |
| | - | | - | | | - | - |
| | | | | | | | TOTAL VOTES |
| SUB TOTAL VOTES | 30,000 | | 12,000 | | | 3,000 | 45,000 |

910 — 2000 ELECTION
915 — Dec 8,2000
925 — Lee County
930 — Polling division
935 — Category C
920 — Amendment
940 — YES
945 — NO
950 — Abandon
955 — SUB TOTAL VOTES
960 — TOTAL VOTES

| 2000 ELE. | Dec 8, 2000 | Lee County | | Polling division | Fort Myer, FL | Register Voter List | | | |
|---|---|---|---|---|---|---|---|---|---|
|  |  |  |  |  |  |  |  |  |  |
| SN | Name | Date of birth | Gender | Residential Address | Mailing address | Email Address (Official) | Email Address (Private) | Phone # | Unique ID |
| 1 | Mel | Jun 18, 1977 | M | Unit108, 12 Skyline Ave., | Unit108, 12 Skyline Ave., | mel@vote.org |  | 239-123456 | 1274567 |
| 2 | Dick | Apr 2, 1955 | M | Unit 108, 12 Skyline Ave., | Unit 108, 12 Skyline Ave., | dick@vote.org | dick@mail.com | 239-456 7364 | 2325678 |
| 3 | Tyler | Sep21, 1982 | M | 1320 Skyline Ave., | Mail box #: 3018 | tyler@vote.org | tyler@mail.com | 239-763 5423 | 3496789 |
| - | - | - | - | - | - | - | - | - | - |
| 40,380 | Cyndy | Oct 1,1960 | F | 820 Main St, | 820 Main St, | cyndy1@vote.org | cyndy@mail.com |  | 4537891 |
| - 1110 | - | - | - | - | - | - | - | - | - |
| 45,000 | Paul | July 12, 1944 | M | Unit 201b, 20 Main St., | P.O. 4763 | peter@vote.org | paul@mail.com | 239-674 5323 | 5678912 |

| 2000 ELECTION | Dec 8, 2000 | Polling division | Public Register Voter List |
|---|---|---|---|
| | 1210 | 1215 | 1220 |
| SN | Email Address (Official) | Phone # | Unique ID |
| 1 | mel@vote.org | 239- 123456 | 1034567 |
| 2 | dick@vote.org | 239-4567364 | 2545678 |
| 3 | tyler@vote.org | 239-7635423 | 3454789 |
| - | - | - | - |
| 40,380 | cyndyl@vote.org | | 4567831 |
| - | | - | - |
| | - | | |
| 45,000 | peter@vote.org | 239-6745323 | 5278912 |

FIG. 12

METHOD OF VERIFIABLE AND ANONYMOUS VOTER RECEIPT FOR ELECTRONIC VOTING SYSTEM

FIELD OF THE INVENTION

The present invention relates to a method for electronic voting system to produce a verifiable and anonymous voter receipt.

BACKGROUND

A modern democratic system requires a free and fair election. Along with development of the democratic and technological changes, people have been trying to find more efficient tools and better ways in helping with the voting and counting system. From mechanical voting machines to electronic voting machines to the Internet voting machine system, we see a number of different voting machine systems in the world, however, the result still being dissatisfaction and a deeper distrust to these kinds of electronic voting systems especially if wireless equipment is involved. Right now, there are two basic kinds of electronic voting systems in the world, direct-recording electronic (DRE) voting machine and Optical Scan (OS) voting system. However, the problem with both of these EV (electronic voting) systems is untraceable and unverifiable after casting a ballot. No one knows if his/her vote has been changed, counted or spoiled. Fraud may happen due to lack of transparency. So far, almost any kind of EV (electronic voting) system leaves many possibilities of being attacked through hacking or virus. In theory, hundreds of thousands of possibilities could manipulate existing EV systems no matter how secure they are. Ironically, the higher the technology applied on an EV system, the more possibilities to be rigged. In fact, the problem is not because of the technology but lack of verification, transparency and auditing. This is the most concerning about EV systems. How to balance the transparency and secrecy is the key issue.

Looking back on previous elections over the years, voters only needed to raise their hands and counted. It is a simple, transparent and audit-able system but lack secrecy, therefore voters may be under pressure to vote, and in extreme cases easy to buy and sell votes. Then for secrecy reasons, developed to cast stone or paper ballot in a black box. It kept secret, however fraud may happen because no one knows where his/her vote goes after casting. Using paper ballot voting with voter signature could cause another problem because of no secrecy once again. Also, along with the increased number of voters, better and more efficient tools and methods were involved in to count the votes. Unfortunately, these counting tools and methods might cause fraud. Even up to recent elections, similar problems still there. Finding a way in keeping both privacy and transparency in an election is the ultimate goal.

Free vote needs secrecy, anonymity and privacy. Fair voting needs transparency. All votes must be accurately counted. Transparency can eliminate rigging, fraud and manipulation which could happen by stealing, bribery, buying or selling votes, hacking the EV system, spoiling or destroying votes, adding residual votes to favour their candidate(s) etc.

In almost all existent voting systems including direct-recording electronic (DRE) voting systems and optical scan voting (OS) systems, some have no transparency and others lack of secrecy. This may lead to fraud or manipulation. Many problems, disputes and unfairness have happened even in recent elections. The consequences could lead to political and social unrest and chaos. Not to mention the financial loss if a national general election failed. Even if the election is fair, the loosing candidate(s) may still feel of uncertainty and distrustful to the EV system and require recounting.

SUMMARY OF THE INVENTION

The disclosure method of voter receipt has both features of transparency and secrecy for an election. This method of voting does not require voters to mark or punch hole(s) on a ballot as a selection but by filling out a UVNS (Unique Voting Number with a voter Signature letter) into a selection section of a ballot as a voter's vote. The UVN (Unique Voting Number) is randomly generated by an EV (Electronic Voting) system, and the Voter Signature letter is chosen by a voter in at least two group of letters, numbers, characters, shapes, symbols and/or colours, which are generated by the EV system as well.

Figure 4:
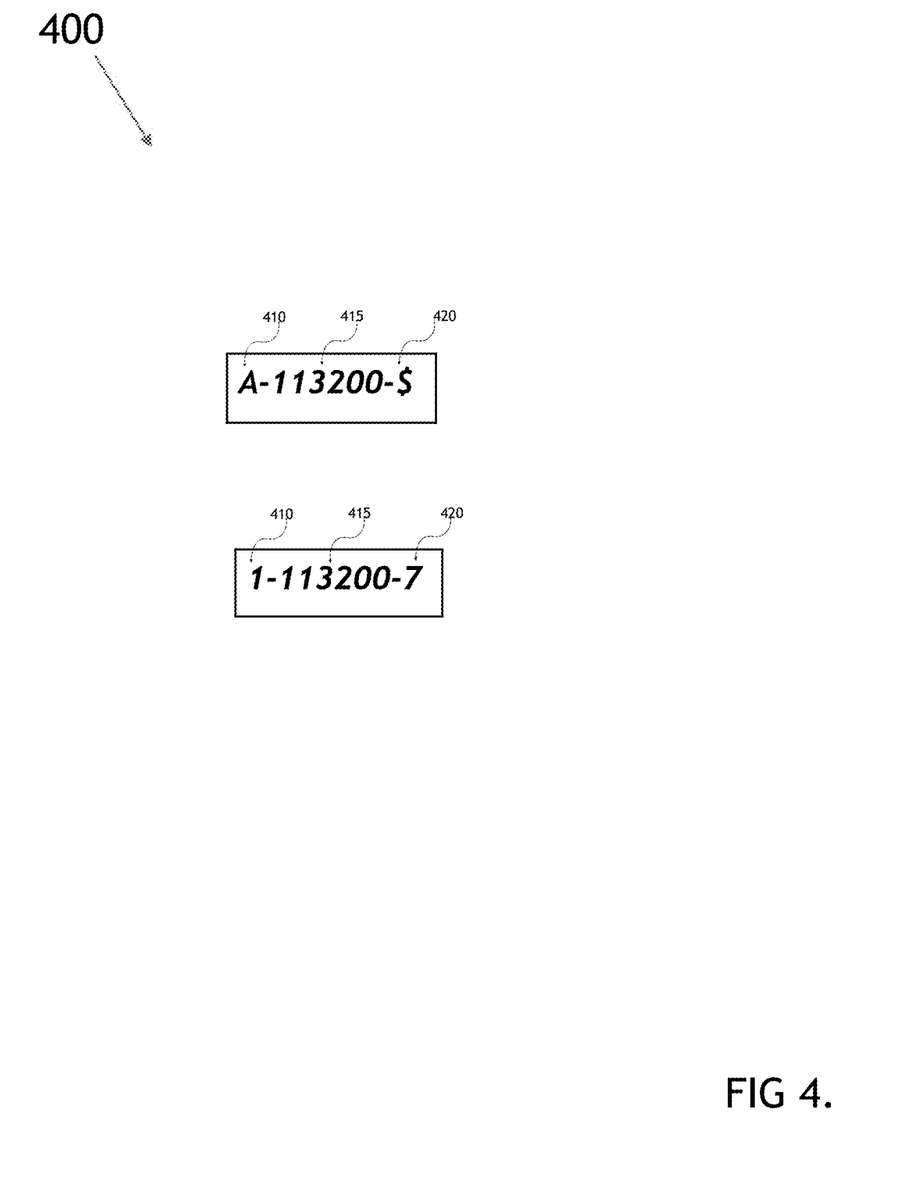
FIG. 4 is a typical format of UVNS.

If there are several types of elections on one ballot, there should be as many categories as types of elections. For example, a ballot could contain three categories: a Presidential Election, a Senator Election and an Amendment vote. Each category has it's own categorical letter that can be represented using a letter, number or symbol in a UVNS (As shown in FIG. 4, the first symbol represents the categorical letter of the UVNS).

The UVN is a unique vote number which is exclusively assigned to one voter for one selection in one election. For example, the voter will fill out a UVNS for one category, for example a presidential election, and If there are more categories on the election, the voter will repeat the process that they went through to complete their first selection.

The Signature letter is to prevent a UVN from being assigned to another voter again. If an EV system assigns the same UVN to another voter, he/she might choose a different voter signature letter from the previous voter. When the result of election is published, two same UVN but different voter signature letters would show on the result of election spreadsheet. If this happens, it means that the EV system has a problem. One UVNS is only for one voter exclusively using as one selection by filled in one of selection sections on a ballot in one election event.

In a multiple candidate election, if need further secure of anonymous, every voter might be assigned as many UVNS as required election number of candidates. By a software program of the EV system, these UVNS have to be filled in different select sections on a ballot. To design a ballot for multiple candidates selection, it may requires the same number of "Write In" as the election candidates that need to be chosen. i.e. If the ballot requires voters to choose two candidates out of five candidates, two "Write In" sections and typing space are required. Similarly with "Abandon". Once a voter selects "Write In", the voter then types his/her candidate's name into the EV system with his/her electronic signature. To be fair, when a Write In candidate gets more votes than being a qualified listing candidate during the rest of election day, the new candidate should be immediately added into the listing candidates by EV system for the rest of election day. For anonymous reasons if a voter selects "Write In", his/her voter receipt does not show the name of his/her candidate, but only shows his/her UVNS selection under "Write In".

After casting a ballot, the EV system generates at least two identical copies of a VAVR (Verifiable and Anonymous Voter Receipt). The voter gets one copy, and the system keeps another copy for verification. If there is an auditing organization involved, then the EV system should send another copy of a VAVR to the auditing organization as well. The voter receipt can be printed, recorded and delivered by text or email.

A voter's VAVR shows more then one UVNS filled in all selections of a ballot. One or some UVNS belong to the voter's, and the remaining UVNS belong to other voter's. So, this voter's UVNS is embedded among the other voters' UVNS on the voter's VAVR. By checking the receipt, no one else can figure out which UVNS is this voter's except for the voter himself/herself. In this way, the voter receipt maintains secrecy. If requiring extra secrecy, the EV system may also duplicate a copy of another voter's receipt for a voter, therefore, no one would know which copy belongs to this voter's except the voter himself/herself.

With this method of VAVR, any voter is not able to sell his/her vote because the voter is not able to make other people fully believe which copy or which selection of the receipt belongs to this voter's. With this method, no voters need to be intimidated to vote because no one else can know the voter's selection. In same reason, no one would be able to bribe voters for vote.

Polling Place & EV System

The election can be held at polling stations, on the internet or a mobile network EV system. The embodiment is based on eligible voter voting. If someone is not on an eligible voter list, they may go to a prevision voting station or onto a prevision voting website to vote. The prevision vote also can use this method too, but the vote receipt is marked as a prevision group and category, counted and published separately. They still can check their prevision votes in the same way. If any one in the prevision group can prove he/she is an eligible voter later before the voting period ends, he/she can move to the eligible voter list and registered voter list and his/her vote will then be counted.

With this method, hackers may ruin the system but they are unable to manipulate the election without leaving traces. Furthermore, the manufacturer of the EV system does not have the capability to manipulate the EV system either, because of the transparency of both the hardware and the open cord of software.

Results & Verification

After the election ends, the results of the election must be published. The published results of the election primarily contain an eligible voter list, a registered voter list, a public register voter list which may be the same as the registered voter list or may only contain a minimal amount of voters' information for privacy reason, and a general election result spreadsheet filled with all UVNS, a VAVR (Verifiable and Anonymous Voter Receipt) List for searching and verifying, and all voter receipts issued by a EV system. Meanwhile, a copy of a package of the Results is sent to the third party for auditing. For privacy reason, the eligible voter list and registered voter list may potentially not be allowed public viewing, but third party agents must be allowed to check and verify these information. All voters can check the public registered voter list and all voter receipts via VAVR List. This can expend to a blockchain of a verification system allowing all voters to use their computers to work verifying their votes and writing them into the blockchain with their VAVR.

Criteria & Fixability

To ensure an election is fair with this method, the EV system needs to meet the following requirements:

1. Any voter can check and verify his/her or other voters' VAVR;

(If a voter forgets his/her UVNS, the voter can still check all UVNS of his/her VAVR. If all these UVNS accurately match to the Election Result, the voter's vote has been counted.)

2. All UVNS must be unique numbers and the same format;

3. All voters' UVNS and selections accurately match the election results;

4. Every voter gets the same number of votes in one election. So, the total number of the registered voters must equal to the total number of voter receipts and equal to the total number of UVNS under one person one vote in one election with one selection. If it is a multiple candidate election, for example, voters need to elect two candidates, every voter has two vote rights and is therefore assigned two UVNS to fill in two different election sections on a given ballot. In this case, the total number of UVNS on the published result spreadsheet must equal two times the number of registered voters;

5. All registered voters are among the eligible voter list;

6. Any voter can check his/her or any personal information via Public Registered Voter List;

7. Third party auditor or a non-partisan and independent electoral management body can inspect, check and monitor all the data and information in polling places and voting centre.

In today's network environment, it's difficult to totally eliminate hacking on line. However, with the method of application, in case an EV system is hacked, or software virus appears, it will leave some traces. There will always be someone who can see the problem. Therefore, the problem can easily be tracked and fixed because a great number of people checking their VAVR in a short period. For example, if a voter found that his/her vote has been changed or has disappeared, the voter can report this. If it is true, the vote can be changed back. If a partial amount of data of votes stored in an EV system are changed or damaged, it can still accurately count the percentage of these bad votes. If the percentage of the bad votes are under tolerant rates by election law, or If all the bad votes add on to any lower vote candidate but still lower than the highest votes candidate in a plurality voting, the result should still be legal. In the worst-case scenario, it still has a chance to recover by manual counting all the VAVR (Verifiable and Anonymous Voter Receipt). Therefore, by utilizing the method of this application, the EV system will be fairer, securer and more efficient.

BRIEF DESCRIPTION OF THE DRAWINGS

The present method of Verifiable and Anonymous Voter Receipt (VAVR) will be apparent with references to the following descriptions and drawings, wherein:

FIG. 5 is an exemplary sample of VAVR.

DETAILED DESCRIPTION OF THE INVENTION

Figure 1:
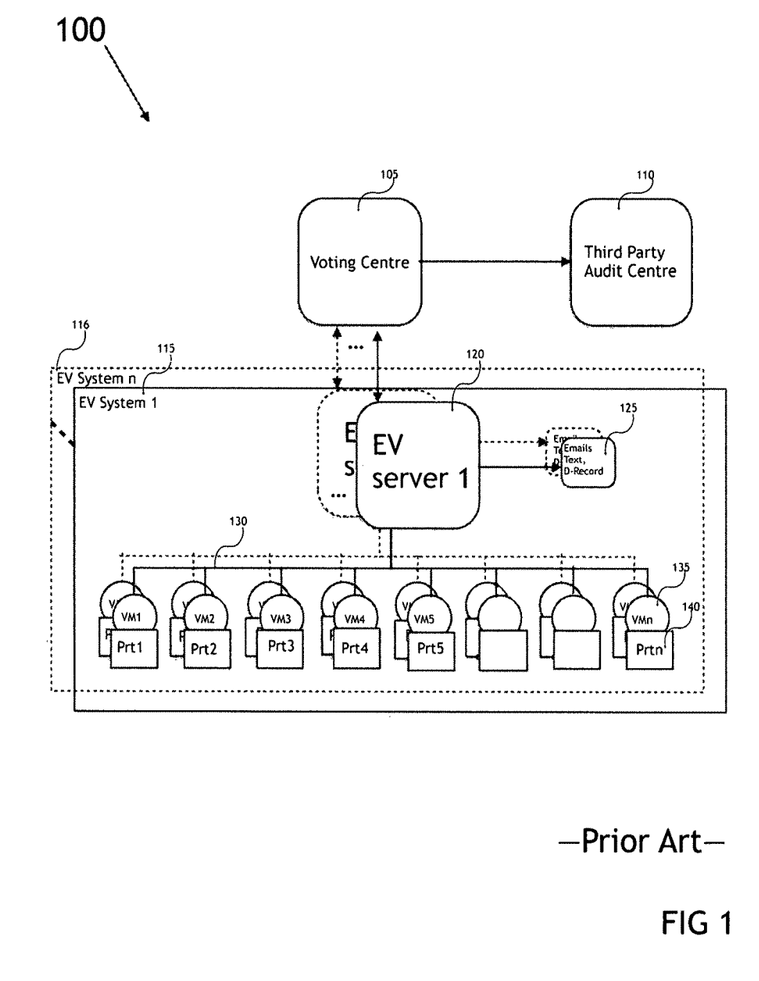
FIG. 1 is a [typical hardware of] common local network system for an EV system 100 of an exemplary embodiment utilizing the method of the application.

Various exemplary embodiments and methods of the application are described in detail below, with reference to the attached drawing figures:

FIG. 1 illustrates a common local network for an EV system 100 of an exemplary embodiment utilizing the method of this application, the voting centre 105 is a voting head quarter for storing eligible voter list, registered voter list, public registered voter list, collecting voting data and information from electronic voting (EV) server 120 located in different polling stations 115,116 and more, sending all information to third party 110 for auditing. The EV server 120 connects several electronic voting machines 135 which attaches with printer 140 by local network or internet 130. The EV server 120 also attaches with digital recorder and sends text and email receipt 125 to voters.

Figure 2:
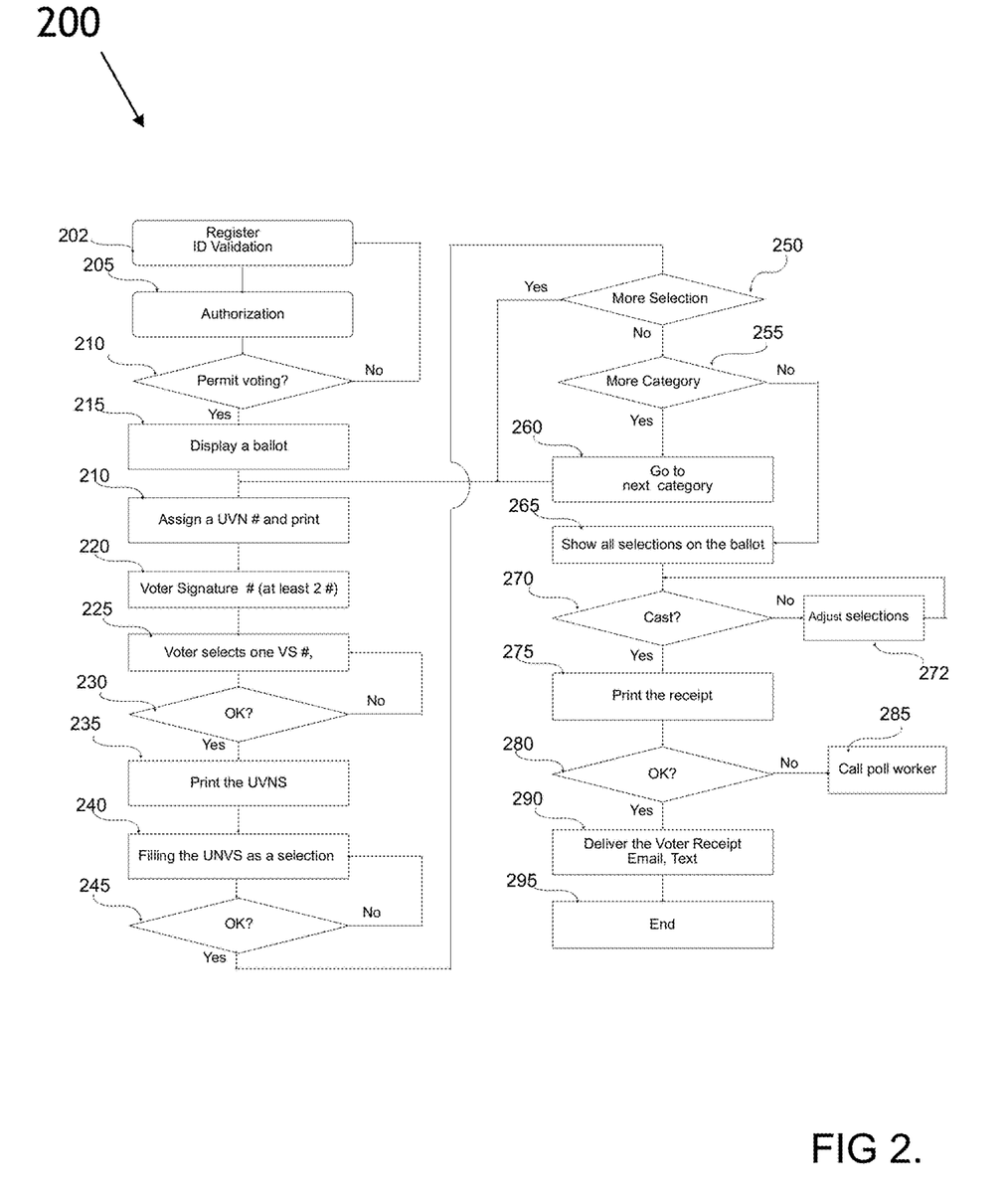
FIG. 2 is a typical software schematics of an exemplary embodiment in the EV system.

FIG. 2 is a software schematics block diagram 200 of an exemplary embodiment running in the EV system 100. The first block 202 is registration. Any voter must be in an eligible voter list and get a permission to use an electronic voting machine with an authorized tool or a password at block 205 to access the EVM. If EVM accept the voter to vote, go to start election at block 215, otherwise go back to block 202. Once start to vote at block 215, the EVM display an empty ballot and explain how to vote. Then, go to the next block 210, the EV system randomly provides a Unique Voter Number (UVN) from a UVN database of the EV system. The UVN is exclusively used for one voter. Then, this UVN will be deleted from the UVN database, therefor, no same UVN will be provides again. To ensure this UVN won't be changed or disappeared during the voting, it needs to be recorded by printing or recording. Then go to the next block 220, the EV system randomly provides at least two letters, numbers, characters, shapes, symbols and/or colours, from a voter Signature Letter database. Then go to block 225 to let the voter choose. Once the voter confirms his/her choosing at block 230, the voter Signature Letter needs to be recorded and/or printed as well at block 235. This voter Signature Letter attached onto the UVN to be a UVNS which is used for one voter, one selection in one ballot. The voter uses this UVNS for selection in the first category if the ballot has more then one election category. The voter fill this UVNS into a selection section to represent that the voter selects a candidate, Write-in or Abandon at block 240, then to confirm his/her selection at block 245. If OK, go to the block 250. If having more selections in this category of the ballot, the EV machine goes back to produce another UVNS, following the same procedural staring from block 210 until all elections finished in this category. Then go to the block 255 to see if have more category needed election. If having more category, go to the next category at block 260 and back to block 210. Following the same process staring from block 210 until all elections and categories finished. Then go to the block 265 to show the voter's all selections to check whether all selections are correct at block 270. If not correct, go to the block 272 to correct the selection(s). If all OK, cast the ballot. The EV then records and prints at least two copies of Verifiable and Anonymous Voter Receipt (VAVR) at block 275. One copy is for the voter and another copy is kept for verification and auditing. The VAVR at block 275 also can be paperless digital recorded.

A Verifiable and Anonymous Voter Receipt (VAVR) not only prints the voter's selection but other voters' remaining selections of a ballot. Therefore, no one can figure out what is this voter's selection with the VAVR. Before leaving, check the VAVR receipt at block 280. The voter only needs to check his/her selection(s) regardless all other voter's selections on his/her VAVR. If wrong, call poll worker at block 285 to let them check your selections and backup sheet, record and final cast ballot. It is easy to figure out what's the problem because every step recorded. If the VAVR is accurate, confirm and go to the block 290 to send the VAVR to the voter via text and/or email. Then the EV machine runs to the end at block 295. The EV machine goes back to 202 and ready for the next voter to vote. The EV system might shred the backup sheet to clean up the record if necessary for secret reason.

Figure 3:
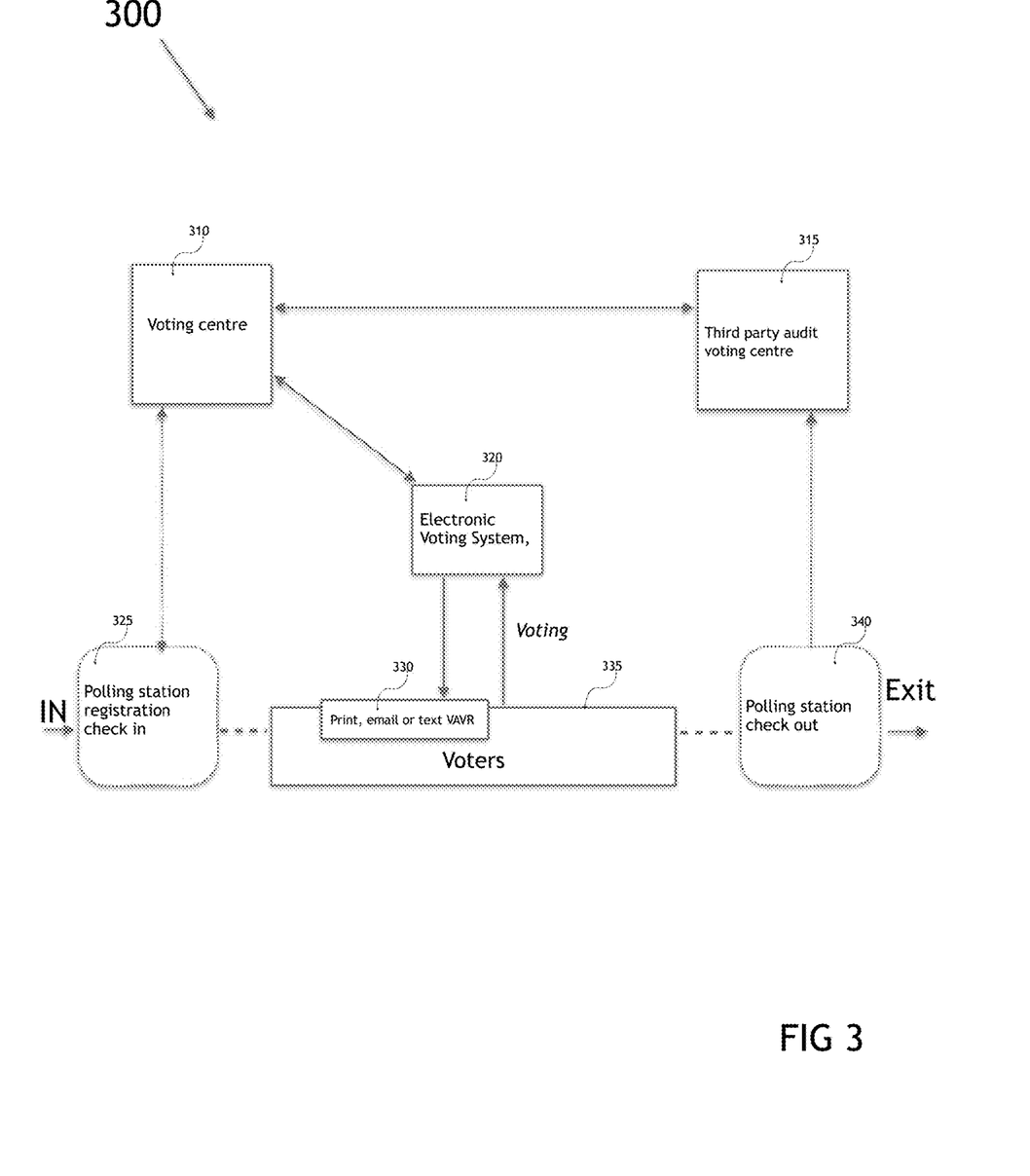
FIG. 3 illustrates an election with an EV system of an exemplary embodiment utilizing the method of this application.

FIG. 3 illustrates an election running with an EV system of an exemplary embodiment utilizing the application of Verifiable and Anonymous Voter Receipt (VAVR) 300.

Voting Centre 310 stores an eligible voter list, collects register voter list from polling station registrations 325, sends permission password to allow the qualified voter using a VM, collects casted ballots from VM 320, sends a copy of election results to third party audit centre 315. Before voting, any voter needs to register with his/her ID information. If qualified, the voter gets an authorization permission by Voting Centre 310 to use VM 320. After casting his/her ballot, the voter gets a VARV 330.

The Voting Centre 310 publishes all results including a VAVR list and an election result spreadsheet, with which, the voter can verify his/her VAVR to see if his/her vote has been counted or not. When a voter leaves the poll place 340 by checking out, the ID information sends to auditing centre 315 to verify the Check In information stored in Voting Centre, both ID information must be matched. There are many way to check in. How to Check In and Check Out are beyond to this application. This is just an exemplary method to secure eligible voters.

FIG. 4 is a format of UVNS 400. the UVNS basically consists of two parts, The first part 415 is a unique voter number UVN. It is randomly produced by a EV system from a UVN database. The UVN 415 is exclusively assigned to one voter. The second part is a voter signature letter chosen by a voter, which can be a letter, number, character, symbol, patten, or colour 420 in a signature letter database. If have more than one election category in one election event, attach the third part of a category number to identify the election category. The category number can either be a number, patten or letter 410. These three parts can be combined to form as any kind of format. for example, the category number can put to the right or left of UVN, as long as the same format of UVNS in one election ballot.

FIG. 5 is an exemplary sample of a VAVR (verifiable and anonymous voter receipt) 500, which contains an election events 502, election date 505, election distraction 510, polling division 515, VAVR number 520, and a barcode or QR code 545 for quick checking the receipt. As a sample, there are three election categories. Category A 525 is for president election; category B 565 is for senator election and category C 590 is for Amendment voting.

Category A for president election only has one selection in several candidates 530, Write-In 540 and Abandon 550.

The category B 565 is senator election which needs to select more than one candidate from several candidatures 570. Here is an example of electing 2 candidates. There are two Write-In 575 and two Abandons 580.

The category C 590 is an amendment voting, which needs to select Yes 595, No or Abandon.

In category A the UVNS attaches an "A" 560. Same as category B attaches a "B" 585, and category C attaches a "C" 597.

If this voter's UVNS has, for example, A-748345-G in category A, B-39879-S and B-3108936-8, in category B, and C-4028331-# in category C. When the voter checks a VAVR 500 with the election result, his/her UVNS are under Candidate2 of president, Candidate1 and Write(2) of Senator, and Abandon of Amendment. All other selections are some other unknown voter's UVNS, and these UVNS should match the result as well.

Figure 6:
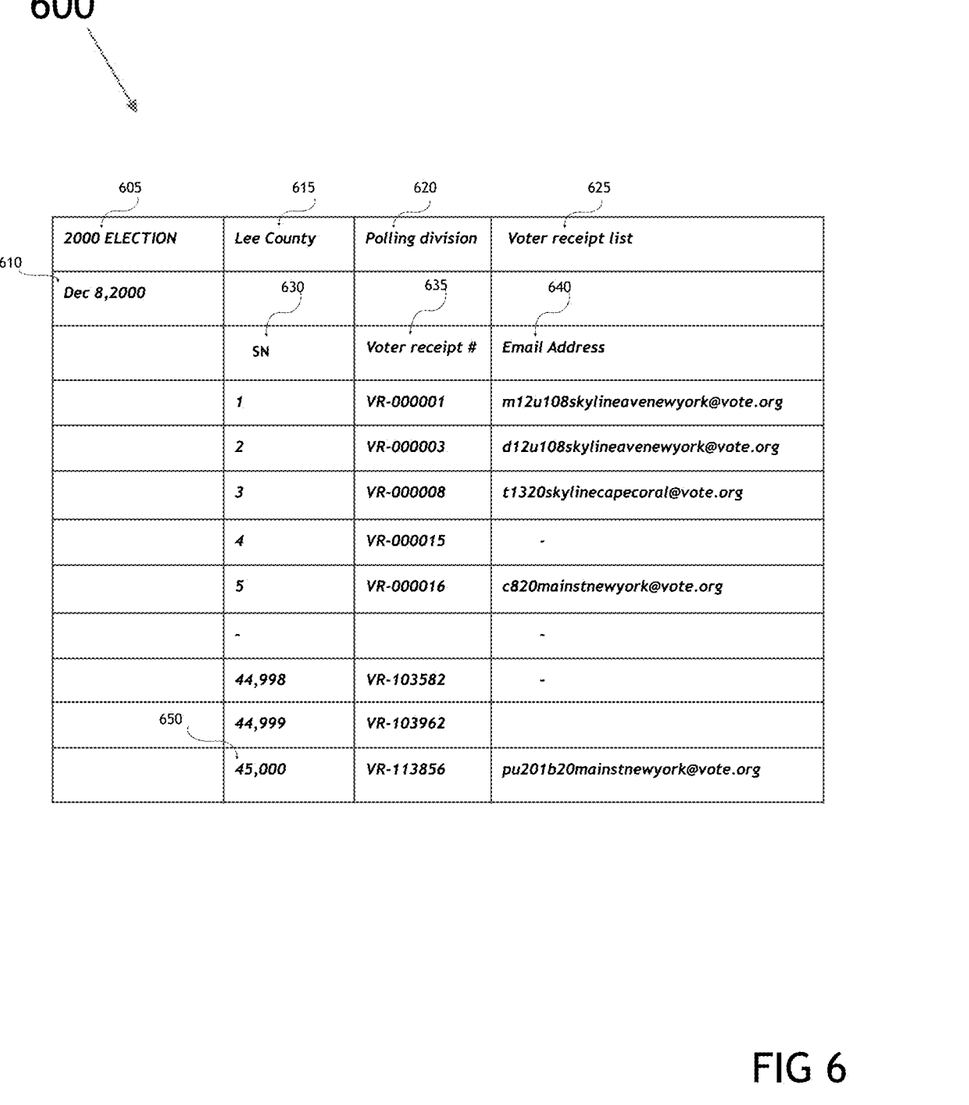
FIG. 6 is an exemplary sample of a list of VAVR.

FIG. 6 is an exemplary sample of a public list of Verifiable and Anonymous Voter Receipts VAVR 600, which shows the election events 605, election date 610, polling division 615, polling division 620, public VAVR list 625. The public VAVN list contains all VAVR series number 630, VAVR number 635 by ascending or descending which is a gateway for a voter to check his/her email address 640. What kind of personal information, such as name, gander, age, address, phone # or voter email address and unique identification is depend on what kind of privacy level required. The total number of VAVN 650 should equal to the total votes.

Figure 7:
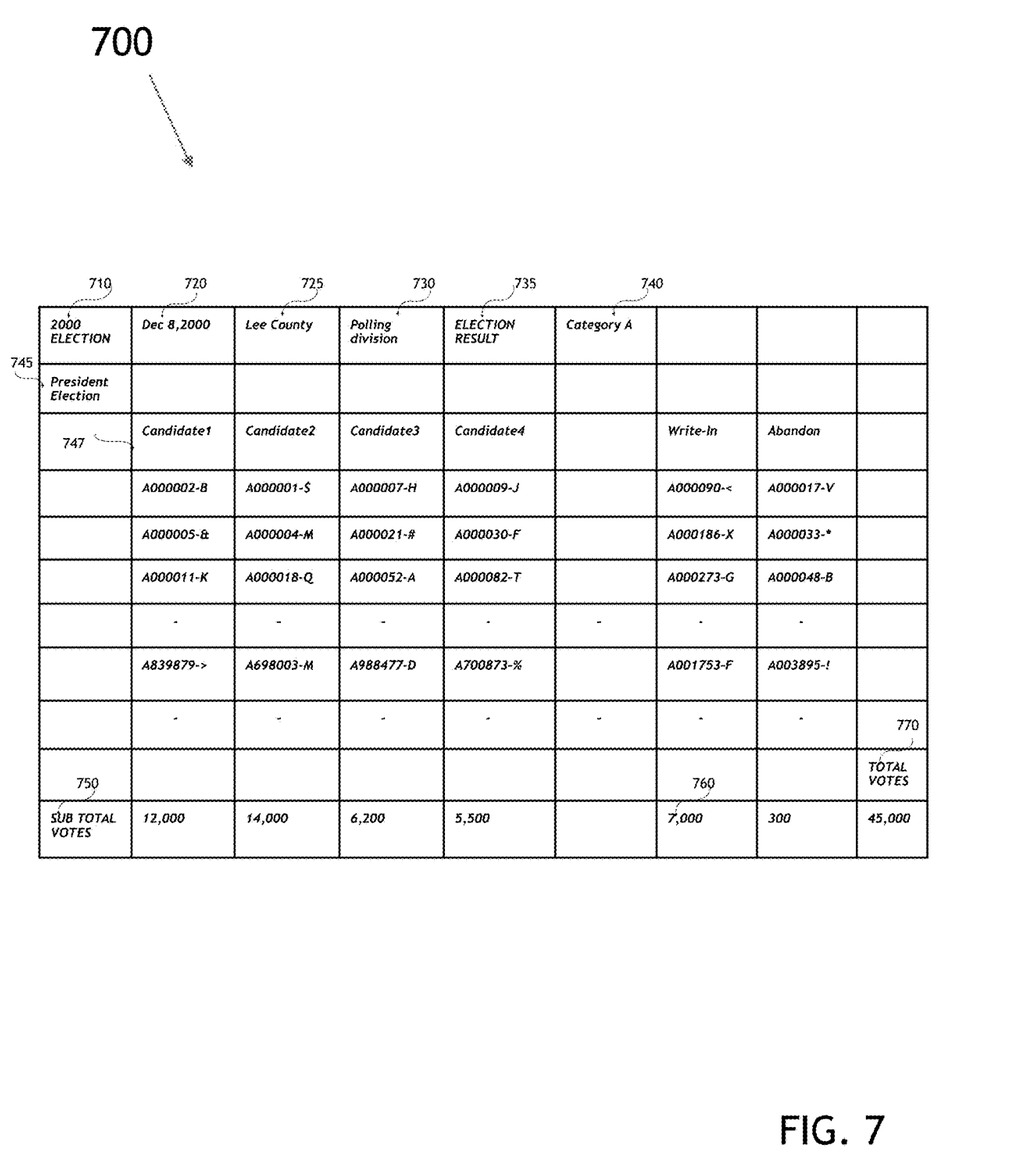
FIG. 7 is an exemplary sample of a general election result spreadsheet for President Election in category A.

FIG. 7 is an exemplary sample of a general election result spreadsheet for category A 700. It shows Election events 710, Election date 720, Electoral district 725, Polling division 730, election result 735 for category A 740.

Figure 8:
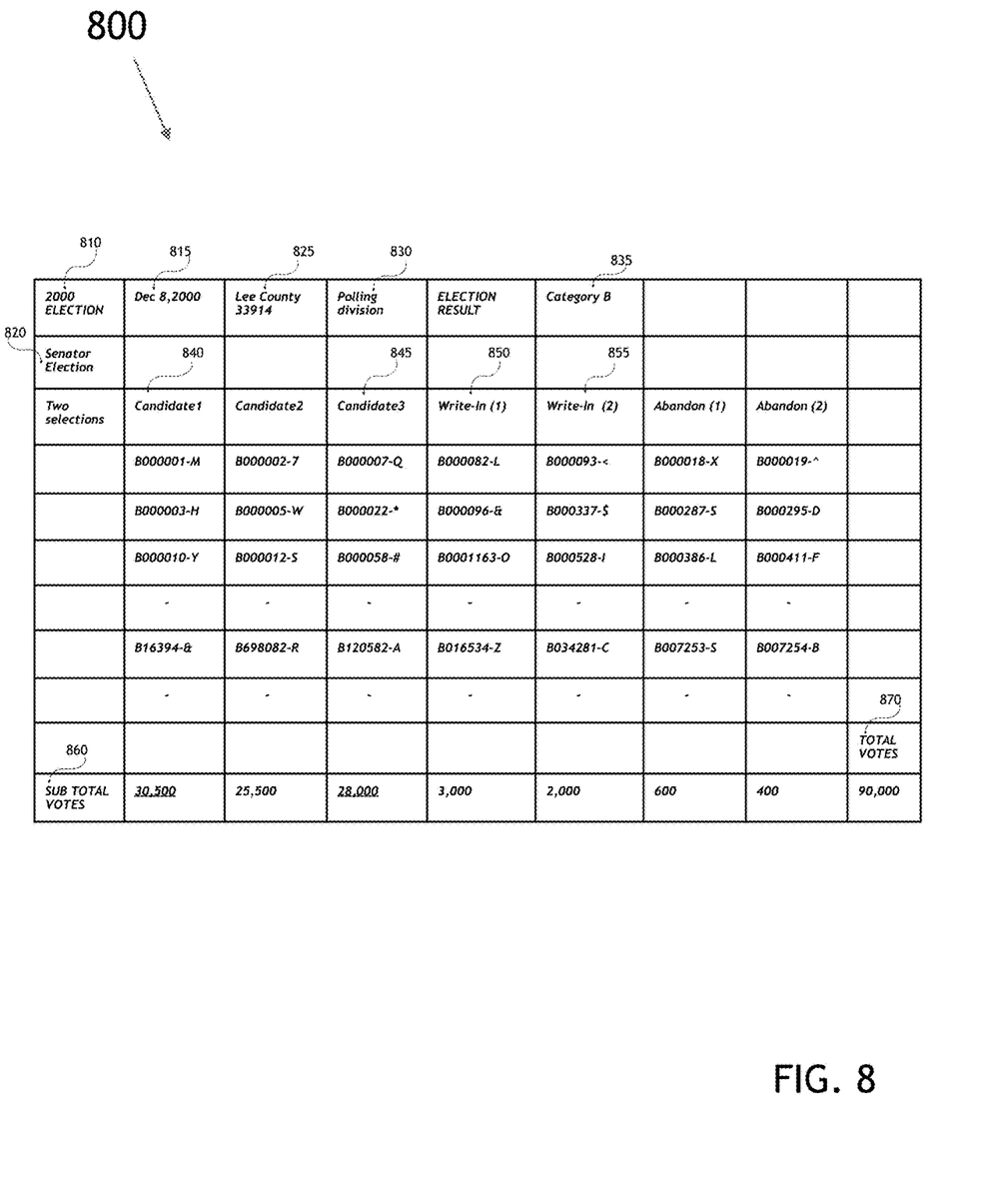
FIG. 8 is an exemplary sample of a general election result spreadsheet for Senator Election result in category B.

The general election result spreadsheet contains candidates 747, Write-In and Abandon. The subtotal votes 750 of each candidate shows on the bottom line. The total votes 770 should equal to the total number of VAVN 650 because every voter has one selection one Category A FIG. 8 is an exemplary sample of an election result spreadsheet for category B 800. It contains Election events 810, election date 815, senator election 820, election distract 825, polling division 830 and election result for Category B 835.

The result spreadsheet shows all candidate votes on the bottom as subtotal number 860. The top two rankings here are Candidate1 840 and Candidate3 845. The senator election of category B is a multi election. This election needs two winners. So each voter has two UVNS to selections in category B. Therefore, the total vote number 870 should equal to 2 times total number of VAVN 650.

Figure 9:
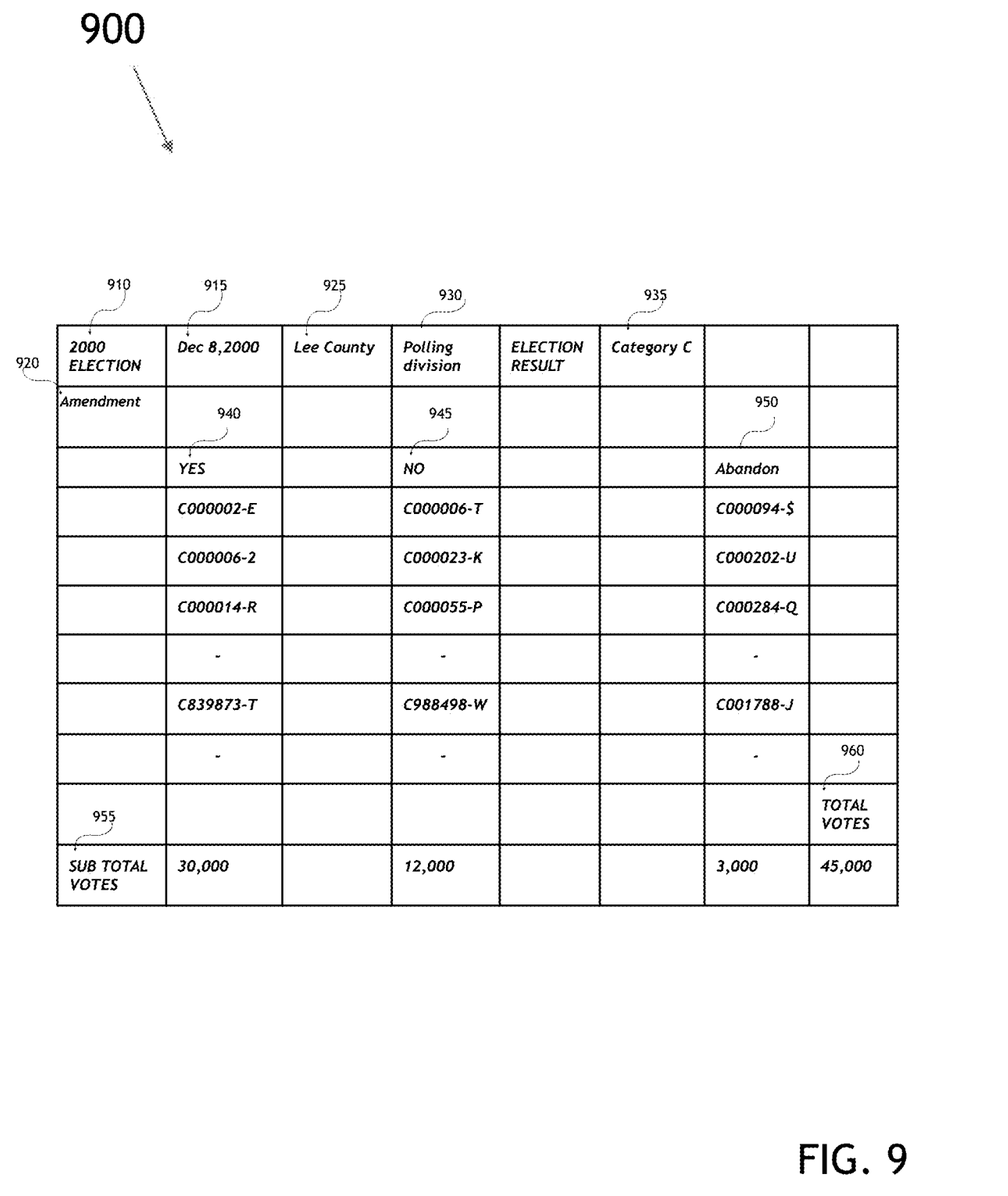
FIG. 9 is an exemplary sample of a general election result spreadsheet for Amendment Vote result in category C.

FIG. 9 is an exemplary sample of an election result spreadsheet for category C 900. It shows voting events 910, voting date 915, the name of voting 920, electoral distract 925, polling division 930 and voting category C 935.

The result of amendment shows "Yes" 940, "No" 945 and "abandon" 950. Subtotal votes 955 on the bottom. Total votes 960 should equal to the total number of VAVR 650 because every voter has one vote for category C.

Figure 10:
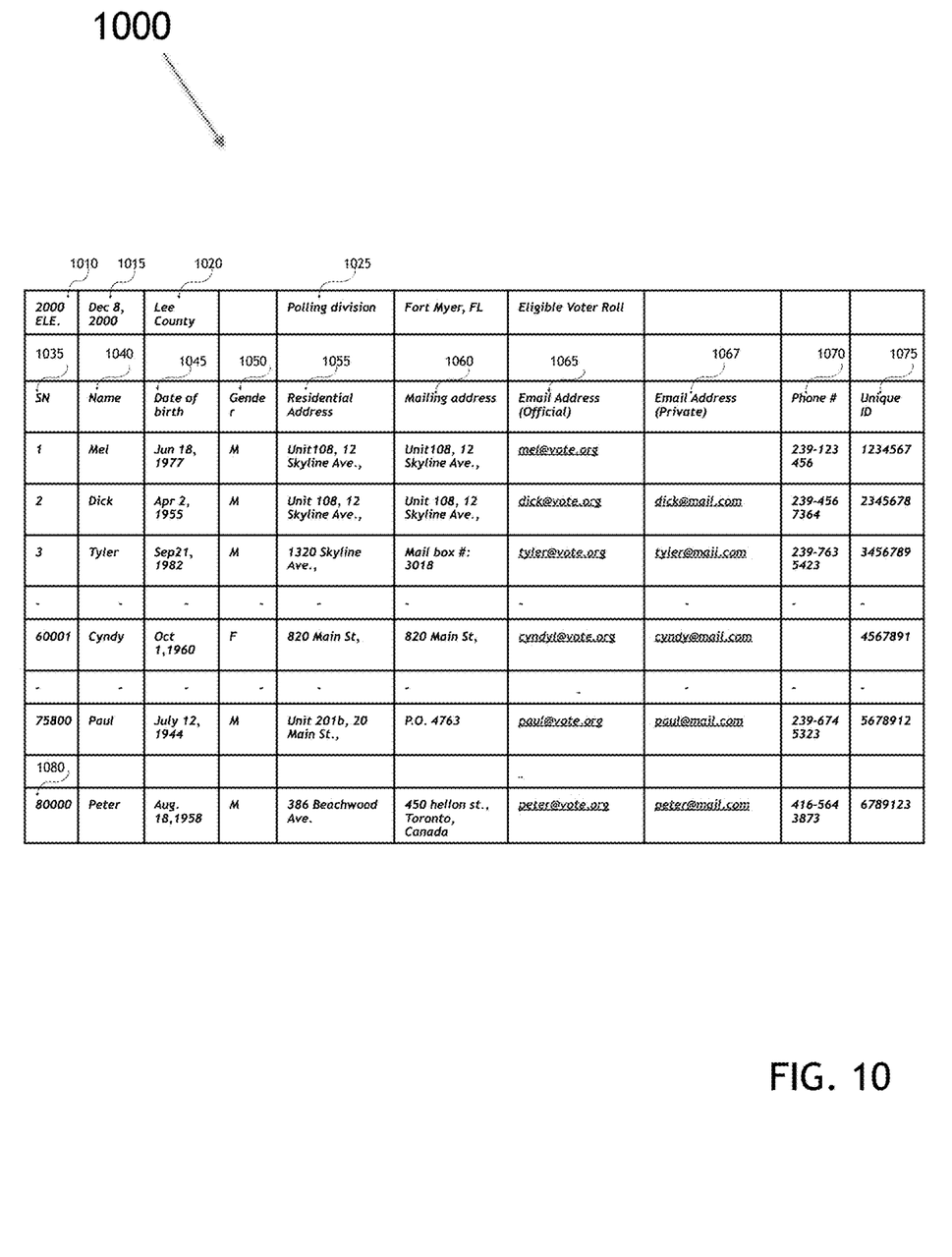
FIG. 10 is an exemplary sample of an eligible voter list.

FIG. 10 is an exemplary sample of an eligible voter list 1000. It shows an election events 1010, election date 1015, election district 1020, polling division 1025. The eligible voter list contains voter's personal Information, for example, voter name 1040, date of birth 1045, gender 1050, residential address 1055, mailing address 1060, official email address 1065, private email address 1067, cell phone number 1070, unique ID 1075. Series number 1035 from 1st to the last voter 1080 which shows the total eligible voters. All official email address 1065 might be assigned by voting centre, which are only used for receiving VAVR and personal information. The private email addresses 1067 may be for receiving election news and notices. The cell phone number 1070 is for receiving text VAVR and personal information. The unique ID or personal identification 1075 is for registration and checking in.

Figure 11:
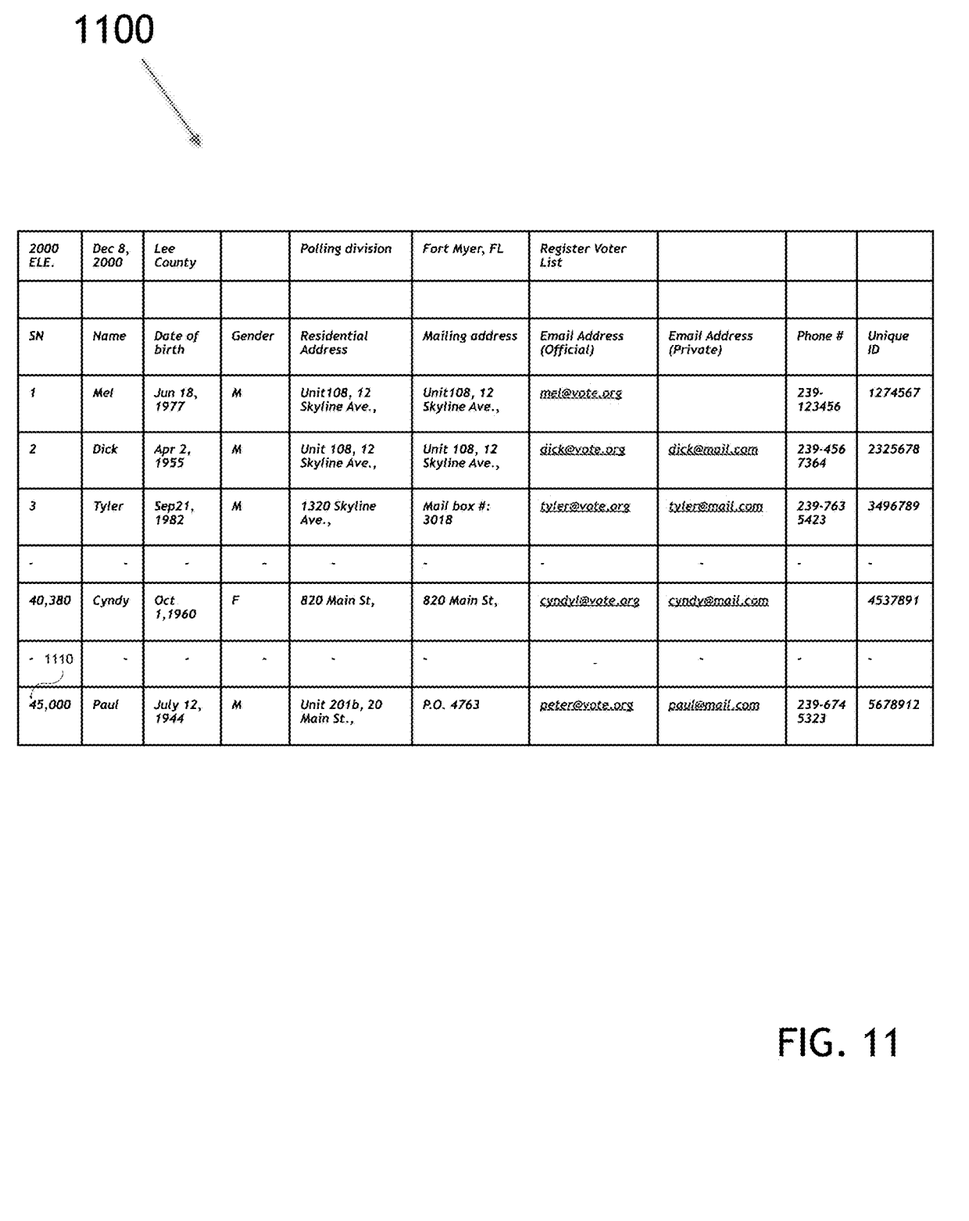
FIG. 11 is an exemplary sample of a registered voter list.

FIG. 11 is an exemplary sample of a Registered Voter List 1100. It is the same format as the eligible voter list. All voters in the Registered Voter List must be in the eligible voter list 1000. The last SN 1110 is The total number of registered voters who take part in the election.

Figure 12:
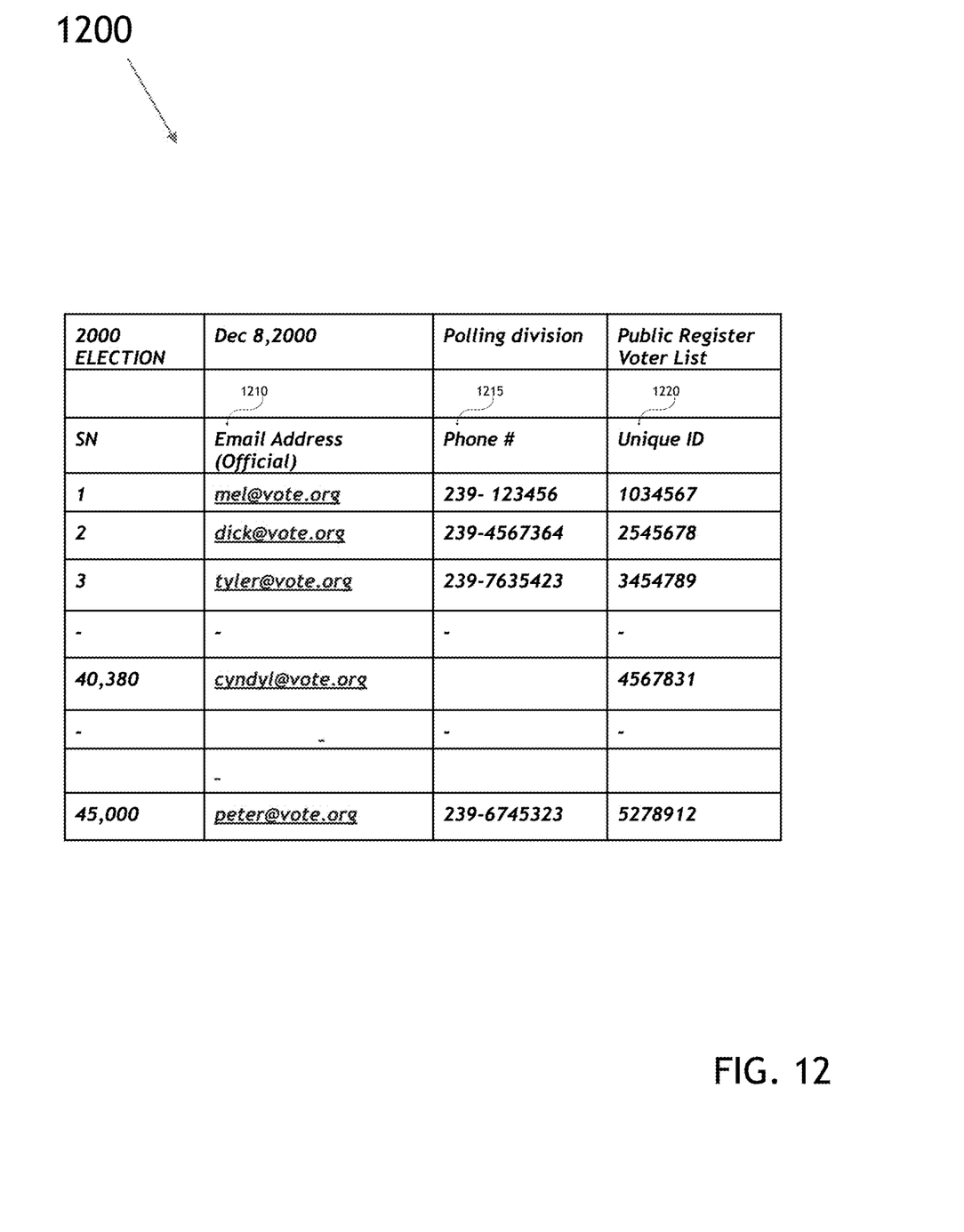
FIG. 12 is an exemplary sample of a public registered voter list.

FIG. 12 is an exemplary sample of a public Register Voter List 1200. It contains minimal information of the Register Voter List 1100 for privacy reason. The more information shows up, the more transparency. How to balance transparency and privacy is up to the election commitment.

The invention claimed is:

1. A method of voting providing an anonymous, verifiable, audit-able, secure, and anti-rigging voter receipt with secrecy and transparency comprising:
   printing a voter's selection by filling a voter's UVNS (Unique Voter Number with Signature Letter) which comprises a Unique Voter Number and a Voter Signature Letter into one of a group of selections of a ballot;
   printing one or more voter selections of other voters' UVNS in the remaining selections of the group of selections of the ballot;
   recording by printing or paperless digital recording, mobile text or emails;
   auditing by third party;
   verifying with a result of an election published after the election ends by a voter utilizing an electronic voting system connected with a local network at a polling station, mobile network or internet.

2. The method of voting of claim 1 is applied to an electronic voting system or electronic survey system for all voters to vote and verify voters' votes after an election or survey closed using the voter receipts.

3. The method of claim 1, wherein said Unique Voter Number is a series digital number, letter(s), or combination of number(s) and letter(s) randomly generated by the electronic voting system.

4. The method of claim 1, wherein said Voter Signature Letter is chosen by a voter from a group of at least two numbers, letters or symbols randomly generated by a Voter Signature Letter Database.

5. The method of claim 1, wherein said ballot is comprised of but not limited to the following elements which are the name of election event, polling place, voting date and time, a ballot series number, all candidates, Write-In, Yes/No, Abstain and all blank election sections.

6. The method of claim 5, wherein said Write-In allows a voter to vote his or her favourite candidate whose name does not appear on the ballot.

7. The method of claim 5, wherein said blank election sections are allowed to be filled out with a voter's UVNS as his/her vote selection.

8. The method of claim 1, wherein said voter receipt is a recorded ballot in which all election sections are filled with a voter's selection and selections of other voters by the voting machine system.

9. The method of claim 8, wherein said recorded ballot is either a paper receipt printed by a printer, or a paperless receipt recorded on digital memory, mobile text or email.

10. The method of claim 9, wherein said digital memory is a memory cartridge, memory USB stick, hard drive.

11. The method of claim 1, wherein said third party is a neutral organization or a block chain system for an election or survey.

12. The method of claim 1, wherein said third party is responsible for monitoring, checking and keeping all the election data and voters' receipts safe preventing loss or change of data during and after election to supply another tool for verification of election results and also check voter receipts by any party and any voter.

13. The method of claim 1, wherein the result of election consists of at least one general election result spreadsheet, a list of all voter receipts, an eligible voter list, a registered voter list, and a public registered voter list.

14. The method of claim 13, wherein the general election result spreadsheet displays all voters' selections in a given election.

15. The method of claim 13, wherein the general election result spreadsheet consists of subtotals of votes under each individual candidate, Yes/No, Write In and Abstain, and a total number of election votes.

16. The method of claim 13, wherein the eligible voter list is a list of all people who have a right to take part in the election or survey, which consists of partial or all eligible voters' personal information, which are name, address, birth date, phone number, email address, any personal ID, and biological identification information.

17. The method of claim 13, wherein the registered voter list is a name list of eligible voters who have registered to vote in an election or survey event, which consists of partial or all registered voters' personal information, which are name, address, birth date, phone number, email address, any personal ID, and biological identification information.

18. The method of claim 1, wherein the receipt consists of a ballot series number, and bar code or QR code.

19. The method of claim 1, wherein electronic voting system is operated with a voting software, which is either a hidden or an open code.

* * * * *